United States Patent [19]
Lambert

[11] 3,810,605
[45] May 14, 1974

[54] STIRRER FOR COOKING VESSELS

[76] Inventor: Benoit Lambert, 8750 Marjolaine, St-Leonard, Montreal 457, Quebec, Canada

[22] Filed: Aug. 4, 1972

[21] Appl. No.: 278,073

[52] U.S. Cl. .................................. 259/108, 99/348
[51] Int. Cl. ............................................... B01f 7/16
[58] Field of Search ............. 259/107, 108, DIG. 35, 259/121, 122; 99/348

[56] References Cited
UNITED STATES PATENTS

| | | |
|---|---|---|
| 3,011,768 | 12/1961 | Clark .................................. 259/108 |
| 3,251,581 | 5/1966 | Jensen ................................ 259/108 |
| 160,033 | 2/1875 | Roush ........................... 259/DIG. 35 |
| 3,697,053 | 10/1972 | Will ..................................... 259/108 |
| 2,805,843 | 9/1957 | Block .................................. 259/107 |

Primary Examiner—Robert W. Jenkins

[57] ABSTRACT

The invention relates to a stirrer with adjustable supports for installation and centering on variable diameter pots and with longitudinally and angularly adjustable paddles for use with pots of various depths.

3 Claims, 4 Drawing Figures

3,810,605

STIRRER FOR COOKING VESSELS

The present invention relates to stirring devices and is particularly concerned with a stirrer for use with frying pans, cooling pots or mixing bowls, although the stirrer according to the invention may also find shop applications.

It is well known that many cooking recipes require extensive and sometimes continuous stirring. Examples of these are cocoa, custards and many types of sauces. The stirring is time-consuming and is made all the more inconvenient in that it has to be done over a hot stove. Many other recipes, such as cakes, also require long mixing of the ingredients in the cold state, which demands effort, and for which power mixers are unsuitable because their lowest speed setting is too fast and does not provide the required torque. There are also many recipes which could be improved by continuous stirring, although the same is not essential.

Motor driven stirrers are known. However they are only available as a unit including the stirrer and the pot or pail and the stirrer is not adaptable to any other container, which severly limits its usefulness.

It is an object of the present invention to provide a stirrer which is adaptable to a variety of pots of different depth and diameter.

To this end the invention consists of a stirrer comprising a housing, support means for the housing engageable with the edge of a pot, a motor means in the housing, a rotor drivingly connected to the motor and at least one paddle connected to the rotor.

In a preferred embodiment of the invention, the support means comprises three elongated members which extend in a common plane from the housing and which are adjustable in length, preferably telescopically and comprise enlarged end portions engageable with the outside of the pot. According to a particular feature of the invention, one of the elongated members has a spring clip at the end thereof fastenable to the edge of the pot.

It will be seen that, with this arrangement, the stirrer according to the invention can be used in connection with a pot of any diameter within an upper and a lower limit and can be centered over the pot to ensure even stirring. The stirrer according to the invention can also be fastened to the edge of the pot to provide the required reaction to the stirring force exerted and to secure the stirrer in position so that it can safely be left operating unattended.

Still more specifically according to the invention the rotor has a vertically extending slot and there are two paddles pivotally connected to the rotor and extending out of the slot, the walls of the slot being of resilient material and the internal surfaces of the slot having corrugations thereon and the paddles having terminal spoon portions and telescopically adjustable handle portions with longitudinally extending keyways and keys on the next larger telescoping portions fitting these keyways.

It will be seen that with this arrangement the stirrer according to the invention can be used in connection with a pot of any depth, within limits and the paddles can be arranged to scrape over any desired area of the bottom or sides of the pot.

A preferred embodiment of the invention is illustrated by way of example in the accompanying drawings, in which.

Figure 1:
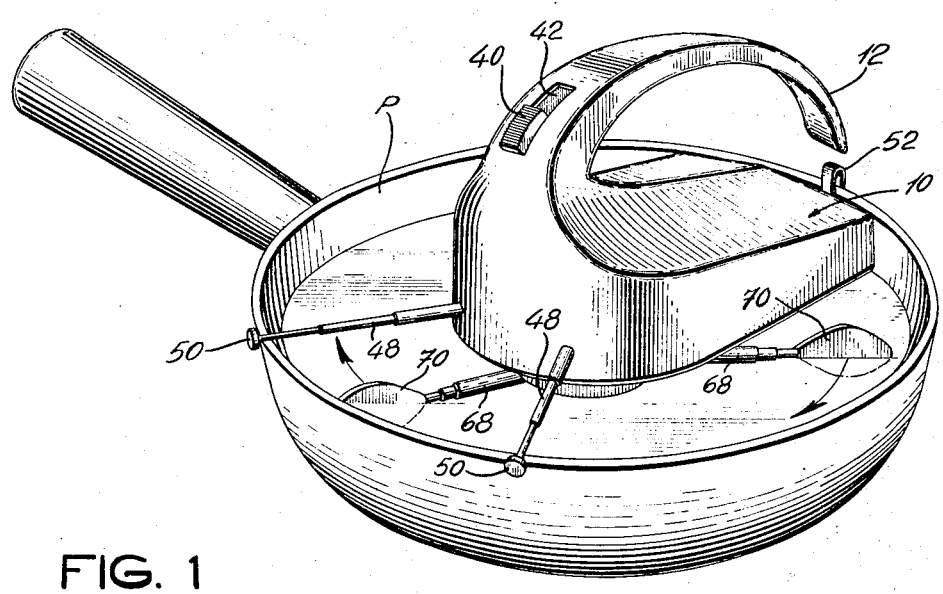
FIG. 1 is a perspective view of the stirrer installed over a frying-pan.
Figure 2:
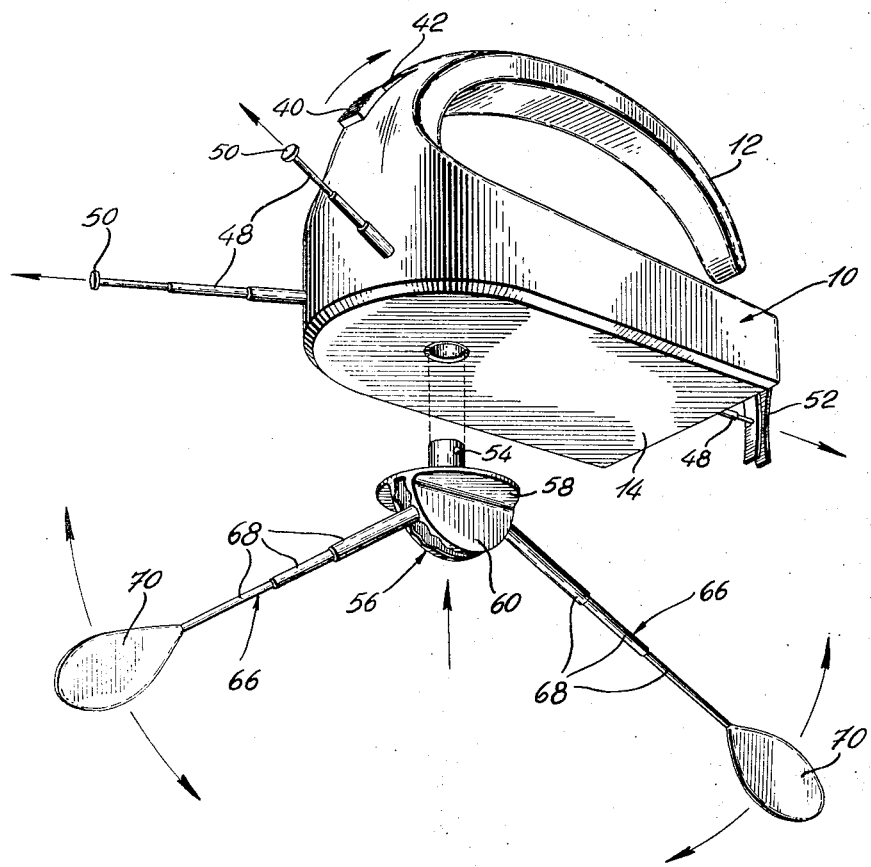
FIG. 2 is a perspective view of the stirrer seen from below with the rotor and paddle unit removed.

Referring to the drawings, the stirrer according to the invention comprises a housing 10, preferably of one piece construction, molded out of plastic material and including a handle 12 and a flush-fitting bottom cover 14 fastened by screws 16 and providing access to the machinery inside the housing 10. The latter includes a motor 18 with a driveshaft 20 going to a speed reducer 22 having an output socket 24 ending flush with the outer face of cover 14. Motor 18 and speed reducer 22 are secured by screws 26 to bottom cover 14.

Power to the motor 18 is supplied via a plug 28 to receive a power cord.

Figure 3:
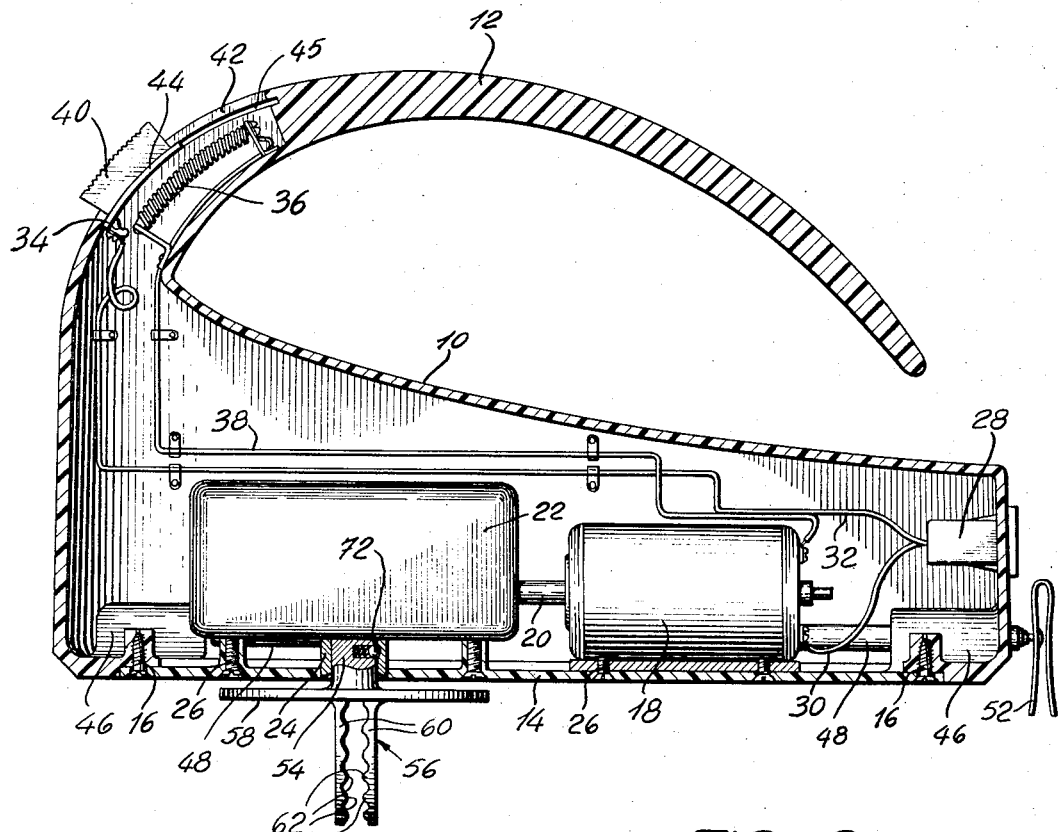
FIG. 3 is a longitudinal cross section view of the stirrer on a vertical plane.
Figure 4:
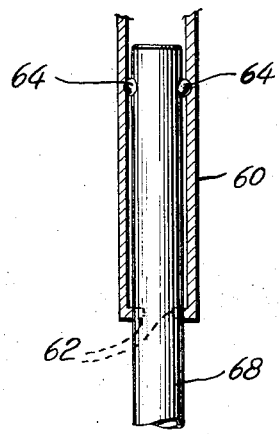
FIG. 4 is a longitudinal sectional detail view of one of the telescopic connections.

Extending out of the slot between the cheeks 60 and hinged thereto are two opposite paddles 66 formed of telescopic parts 68. Paddles 68 have, at the outer end of their outermost telescopic parts, spoons 70. Hinging of the paddles 66 is by means of hemispherical protuberances 64 on the innermost part 68 received in corresponding grooves on the inner faces of the cheeks 60 (FIG. 4). The shaft 54 is removably fastened in the socket 24 by a spring urged ball 72 (FIG. 3), acting as a detent. The paddle parts 66 may be provided with keyways (not shown) extending longitudinally and into which are fitted keys (not shown), of the next larger telescoping portions, to prevent rotation of the spoons 70.

The clip 52 is fitted over the edge of the pan P and the corresponding arm 48 is extended until the rotor 56 overlies roughly the center of the pan while holding the stirrer by means of the handle 12. The other two arms 48 are then extended until the heads 50 are just beyond the pan edge.

The paddles 66 are then adjusted both longitudinally and angularly to obtain the stirring action at the desired location in the pan. The two paddles may be given different angles and extended to different lengths to obtain stirring over a larger area. The paddles 68 retain the angular position which is given them due to the corrugations 62. Adjustment is made possible by the resiliency of the cheeks 60.

As soon as these adjustments are completed, the stirrer can be started by actuating the button 40. One conductor 30 out of plug 28 goes directly to motor 18. The other conductor 32 leads to a switch member 34 of a rheostat 36 which feeds back to motor 18 through a conductor 38. Switch member 34 is secured to and operated by a button 40 projecting to the outside of the housing 10 at the root of handle 12 through a slot 42 and slidable therein by means of an inner metal leaf 44 to operate motor 18 and control its output speed and consequently the output speed of socket 24, which determines the stirring speed. The leaf 44, secured to the bottom 40, slides in grooves 45 on either side of the slot 42.

Moulded integrally with housing 10 at the bottom corner thereof, are three bearing portions 46 perforated to receive outwardly slidable and extensible telescoping arms 48, two of which diverge out of the front end of the housing 10 while the third is at the rear near the plug 28. The two front telescoping arms 48 are provided with enlarged heads 50 secured to the outer end of the innermost members thereof, while the rear telescoping arm 48 has fastened at the end of the outermost member thereof a spring clip 52. The three telescoping arms 48 all extend in a common plane parallel to and slightly above the plane of the bottom cover 14.

The output socket 24 of the speed reducer 22 is adapted to receive a shaft 54 of a rotor 56 which has a spatter plate 58 perpendicular to and located at the end of the shaft 54. Projecting perpendicularly from spatter plate 58 on the side thereof opposite the shaft 54 are a pair of parallel cheeks semicircular 60, having a certain resilience, defining a slot therebetween and provided with the corrugations.

For brief stirring the stirrer can be hand held over a pan without the use of the arms 48.

The unit, including the rotor 56 and the paddles 68, can be removed for washing.

I claim:

1. A stirrer comprising:

a housing having motor means therein;

three arms telescopically extensible from said housing, in a common plane and adapted to rest on the upper rim of a vessel, one of said arms having clip means for gripping said vessel;

a rotor below said housing connected to said motor means for rotation thereby;

a pair of paddles pivotally mounted on said rotor for pivotal adjustment about a horizontal axis on said rotor, said paddles comprising telescopically adjustable members whereby they may be adjusted to a desired length.

2. A stirrer as defined in claim 1 wherein said rotor comprises a pair of resilient cheek members defining a vertical slot therebetween, said paddles being mounted for pivotal adjustment in said slot and said cheeks being corrugated within said slot to thereby hold said paddles in selected positions of angular adjustment.

3. A stirrer as defined in claim 1 wherein said paddles have terminal spoons at their outer ends, said telescopically adjustable members having cooperating keys and keyways to prevent rotation of said spoons about the axes of said paddles.

* * * * *